March 4, 1941. C. E. EMMER 2,234,044
PLASTIC BINDING STRIPPING DEVICE
Filed July 10, 1939 2 Sheets-Sheet 1
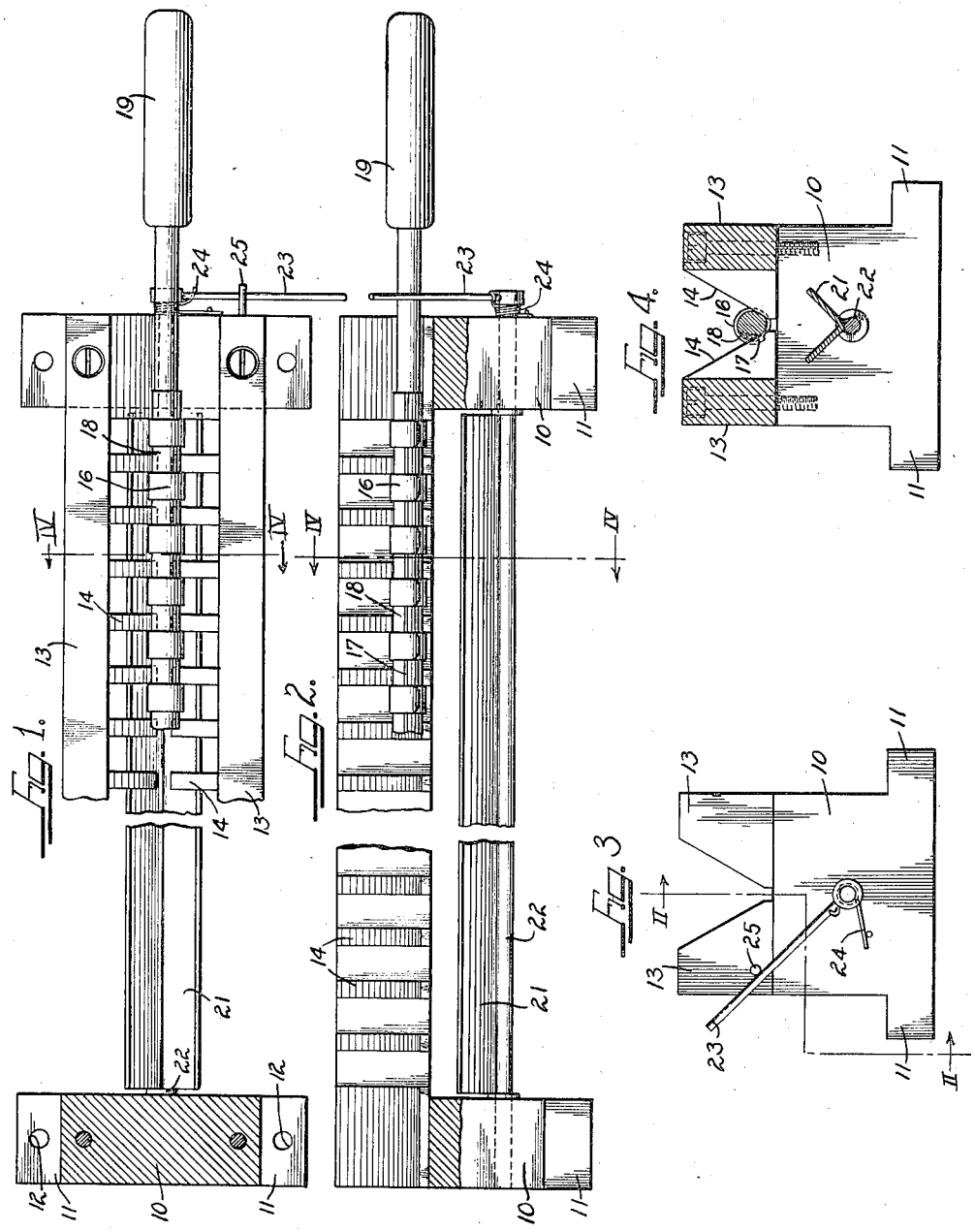
Inventor
CHARLES EDWARD EMMER March 4, 1941.     C. E. EMMER     2,234,044
PLASTIC BINDING STRIPPING DEVICE
Filed July 10, 1939     2 Sheets-Sheet 2

Inventor
CHARLES EDWARD EMMER

Patented Mar. 4, 1941

2,234,044

UNITED STATES PATENT OFFICE 2,234,044

PLASTIC BINDING STRIPPING DEVICE

Charles Edward Emmer, Chicago, Ill., assignor to Cercla, Inc., Chicago, Ill., a corporation of Illinois Application July 10, 1939, Serial No. 283,583

13 Claims. (Cl. 18—1)

This invention relates to the manufacture of plastic bindings of the general type shown in my copending application, Serial No. 265,861, filed April 3, 1939 and entitled "Machine for forming plastic binding."

Bindings of this type are formed from a flat sheet of thermoplastic material such as Celluloid, cellulose acetate, or other suitable plastic, and, in making the binding, the piece of sheet plastic is wrapped around an arbor which may or may not have a slot into which a portion of the binding projects, depending upon the particular type of plastic binding being made. The wrapping of the material around the arbor is done while the material is warm and in a soft or plastic condition so that, when it cools off, it will be set in the desired curled-up shape.

If the plastic binding is allowed to remain on the mandrel until it cools and has set in its curled form, no difficulty will be encountered in sliding it off of the mandrel, but considerable time will be lost while waiting for the plastic binding to cool, and the time thus lost becomes an important factor in the cost of production. If an attempt is made to remove the plastic binding from the mandrel before it has cooled and set so as to save time, and if no special devices are employed, the plastic binding will, in many cases, be bent or deformed and be thus rendered unsuitable for use. Thus much of the time which is saved by taking the plastic bindings off of the mandrel before they have cooled to a setting temperature is lost on account of the bindings that are spoilt.

One of the principal objects of the present invention is to provide a device which will enable the plastic bindings to be stripped from the mandrel upon which they are formed without waiting for them to cool off and set, and which will allow this to be accomplished without bending or otherwise deforming or spoiling the bindings.

Another object of the present invention is to provide a device which will permit a plastic binding to be stripped off of a forming mandrel more easily and quickly than it could be accomplished by hand, irrespective of whether the plastic binding is set or not.

Another object of this invention is to provide a device for stripping plastic bindings from a forming mandrel and which applies a force to each ring of the binding in order to slide it along and off of the mandrel.

Another object of this invention is to provide a device for stripping plastic bindings from a forming mandrel and for holding them straight after they are stripped off until they have cooled and set.

The novel features which I believe to be characteristic of my invention are set forth with particularity in the appended claims. My invention itself, however, both as to its organization and manner of construction, together with further objects and advantages may best be understood by reference to the following description, taken in connection with the accompanying drawings, in which:

Figure 1 is a plan view of a device forming one of the preferred embodiments of the invention, the central portion of the device being broken out to reduce its length and the upper portion of one end being broken away in order to show the lower portion more clearly;

Figure 2 is a side view of the device shown in Figure 1, the upper portion being shown in section to show its internal construction, the section being taken on the line II—II of Figure 3 and looking in the direction of the arrows;

Figure 3 is a right-hand end view of the device shown in Figures 1 and 2, the mandrel and bindings shown in Figures 1 and 2 being omitted in Figure 3;

Figure 4 is a cross section of the device shown in Figures 1, 2 and 3, the section being taken on the lines IV—IV of Figures 1 and 2 and looking in the direction of the arrows;

Figure 6:
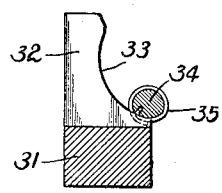
Figure 6 is a cross section of a third form of the invention.

The particular form of the invention shown in the Figures 1 to 4 comprises a pair of pedestals 10 having laterally extending feet 11 provided with holes 12 by means of which they may be bolted or otherwise secured to a work table or bench. The upper portions of the two pedestals 10 are joined by a pair of horizontal longitudinally extending side bars 13 which are spaced apart a distance somewhat greater than the outside diameter of the largest plastic binding which is to be stripped off of its mandrel, it being understood, of course, that the device shown in the drawings can be employed with equal facility to remove bindings of different sizes from their forming mandrels.

Each of the side bars 13 carries a plurality of triangular plates 14 which extend vertically and project laterally toward the other side bar 13. The plates 14, which may be termed "stripper plates" because they do the actual stripping of the binding from the mandrel, are arranged in pairs, one plate of each pair being on each side bar 13, and the two stripper plates 14 of each pair are directly opposite and in line with each other. The edges of the stripper plates 14 which face each other slope down and toward each other but do not quite touch at the bottom, so as to define a V which is open at the top and has a small opening 15 at the bottom or apex. The openings or gaps 15 at the bottoms of the V's are smaller than the smallest size of mandrel from which a plastic binding is to be stripped by the device but are wide enough to allow the longitudinally extending portion or backbone of the plastic bindings to fall through.

The successive pairs of stripper plates 14 are spaced longitudinally of the side bars 13 with the same spacing that is employed for the rings 16 of the plastic bindings 16, 17. This spacing is standard for different sizes of bindings, the different sizes of bindings differing from each other chiefly in the diameter of the rings 16, the spacing of the rings being kept constant in order to allow much of the same machinery to be used in connection with all of the different sizes of bindings that are made. This fact, in connection with the sloping edges of the stripper plates 14, allows the stripping device to be used for stripping a wide range of sizes of bindings from their mandrels.

In using the device, the mandrel 18 carried by its handle 19, is laid down in the V's formed by the stripper plates 14, care being taken to see that the rings 16 of the bindings come between successive pairs of stripper plates so that the mandrel 18 lies directly against the edges of the stripper plates. Because of the V-shape of the notches formed by the stripper plates 14, different sizes of mandrels carrying different sizes of bindings will be accommodated equally well, the larger mandrels merely resting higher in the V's than the smaller ones.

If the mandrel is of the plain cylindrical variety and the plastic binding formed upon it has its longitudinally extending portion or backbone lying against the outside of the mandrel, care should also be taken to see that this backbone is either on top of or underneath the mandrel and does not lie between the mandrel and the edges of the stripper plate 14. If the mandrel is of the type shown in my above mentioned co-pending application and having a longitudinal groove into which the backbone 17 of the binding is fitted, care should be taken to see that the mandrel 18 rests against the stripper plates 14 in such a position that one of the two lines of contact of the mandrel with the stripper plates lies along the overlapping portions of the rings 16 of the binding and is near the slot containing the backbone 17.

After the mandrel 18 is laid on the stripper plates 14 as described above, it is slid edgewise by pulling upon the handle 19, care being taken during this operation to keep the entire length of the mandrel down against the edges of the stripper plates. When this is done, each ring 16 of the binding comes in contact with a pair of stripper plates 14 and is prevented from moving with the mandrel 18. This strips the binding 16, 17 from the mandrel. If the mandrel is carefully placed as described above before it is pulled out of the binding, the stripper plates 14 will catch each ring 16 of the binding at a point very close to the longitudinal part or backbone 17 of the binding and the stresses in the binding during the stripping operation will be as low as possible. This allows the binding to be stripped from the mandrel in the minimum practical time after it is formed and largely eliminates waiting for the binding to cool.

As soon as the mandrel 18 has been withdrawn from the binding 16, 17, the binding is left with its rings 16 between the pairs of stripper plates 14 and with its backbone 17 extending across the stripper plates. The binding then falls, the rings 16 passing between adjacent pairs of stripper plates 14 and the backbone 17 sliding along the edges of the stripper plates and falling through the gap 15 between the stripper plates on the two sides. Since the binding 16, 17 is still quite soft, I have provided means to catch it and hold it in line until it cools off and sets. This means consists of a V-shaped trough 21 extending the length of the device directly below the gaps 15 through which the binding falls. The trough 21 catches the binding and, because of its V-shape, supports each ring of the binding in a pair of points. Since the trough 21 is straight, these pairs of points are all in line with each other and the binding is held straight.

Removal of each binding from the trough 21 before the next binding is stripped is desirable in order that one binding will not fall upon the one previously stripped. This is accomplished by fixing the trough 21 to a longitudinally extending spindle or shaft 22 which is journaled in the pedestals 10. The position of the shaft is controlled by a radially projecting handle 23 fixed to one end of the shaft. The handle 23 is provided with a spring 24 which tends to turn the shaft 22 and press the handle 23 against a stop 25, the stop 25 being located so that when the handle is held against it by the spring 24, the trough 21 will be right side up. Then, when a binding has been stripped and lies in the trough 21 and another binding has been formed upon the forming mandrel and is about to be stripped off of the mandrel, the handle 23 is swung down and the trough 21 tipped far enough to discharge the binding resting in it. By this time, of course, the binding resting in the trough has cooled enough so that it is set, and it will not be injured by falling on top of a number of previously discharged bindings.

Figure 5:
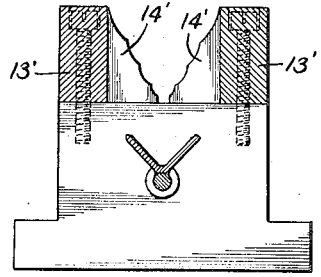
Figure 5 is a cross section, similar to Figure 4, of a modified form of the invention.

The embodiment of the invention described above and illustrated in Figures 1 to 4 is designed to operate satisfactorily with bindings formed upon any mandrel lying within the range of sizes for which the device is adapted. The straight edges of the stripper plate 14 will accommodate equally well an infinite variety of sizes of mandrels lying between the maximum and minimum for which the device is designed. However, if the device is to be used for stripping bindings from only three or four different sizes of mandrels, the device may be modified as shown in Figure 5 in order to secure a better contact between the edges of the stripper plate and the mandrel. In this form of the device, the stripper plates 14' carried by the longitudinal bars 13' are provided with shallow notches along their edges. These notches are made so that each pair of rows of notches, one row of each pair being in the edges of the stripper plates 14' secured to one of the two bars 13', fits one of the sizes of mandrels with which the machine is designed to be used. Thus each of the several sizes of mandrel will fit down into notches at either side, and the edges of the stripper plate 14' will be in contact with the surface of the mandrel for a considerable portion of its circumference.

Thus a greater portion of each of the rings of the binding will be engaged by stripper plates 14' and the stresses set up in the binding by the stripping operation will be lowered.

Other and simpler forms of the invention may be devised. For example, a base 31 may be provided with a plurality of evenly spaced stripper plates 32 extending up from the base 31 and having the shape shown in Figure 6. In this form of the invention, one upright edge 33 of the stripper plates 32 is cut out along a curve which may be uniform but which preferably gradually decreases in curvature from one end to another. This form of the invention is particularly useful in connection with various sizes of mandrels 34 having a flattened side. As such mandrels are now designed, the flattened side is not absolutely flat but has a curvature which is approximately one-half of the remainder of the mandrel. In removing a binding 35 from such a mandrel 34 with the device shown in Figure 6, the mandrel 34 is placed against the curved edges 33 of the stripper plates 32 with the flat side of the mandrel against the edges 33 of the stripper plates and with the rings of the binding 35 lying between the successive stripper plates 32. If the edges 33 of the stripper plates 32 are of varied curvature, the mandrel 34 can be moved up or down along the curved edges until a spot is found where the curvature of the stripper plate edges 33 approximately matches the curvature of the flat side of the mandrel 34. This is the preferred position for the mandrel 34 during the stripping operation and will, of course, be different for each different size of mandrel but will always be the same for the same size. Thus the operator, after stripping the first binding from a mandrel, will be able to immediately place the mandrel in the preferred position for stripping of the binding without loss of time.

Figure 7:
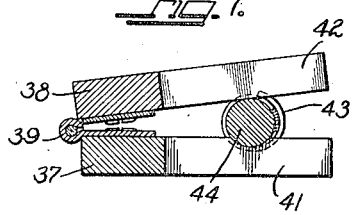
Figure 7 is a cross section through a fourth form of the invention.

Another form of the device is shown in Figure 7 and comprises a pair of longitudinally extending members 37 and 38 which are connected together along one edge by a hinge 39 and are provided with laterally projecting stripping plates 41 and 42. Each set of stripping plates 41 or 42 and the member 37 or 38 which supports it is made like a comb with the stripping plate 41 or 42 spaced uniformly with the same spacing as the rings of the binding 43 to be removed from a mandrel 44. To use this device, the mandrel 44 carrying the binding 43 is placed between the two sets of stripping plates 41, 42 which are then swung together so as to grip the mandrel 44 between them, the individual stripping plates coming, of course, between the individual rings of the binding 43. The mandrel 44 is then drawn endwise which causes the stripping plates 41 and 42 to slide the binding 43 off of the mandrel.

It will be noted that in the particular form of the invention shown in Figure 7, I have shown a mandrel of the plain cylindrical type upon which the older forms of plastic bindings 43 are adapted to be formed, but it will of course be understood that this form of the invention, as well as the others, may be used with any form of mandrel and any form of plastic binding. The stripper plates 41 or 42 may have either straight or notched edges to fit the mandrel 44, the device shown having, for the purpose of illustration, straight edges on one set of stripper plates 42 and notched edges on the other set of stripper plates 41. Also, the same device may be provided with a plurality of notches to accommodate mandrels of different sizes and suitable handles or other mechanism may be provided for moving the two sets of stripper plates 41 and 42 relative to each other.

Figure 9:
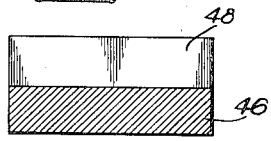
Figure 9 is a cross section of the form of the invention shown in Figure 8.
Figure 8:
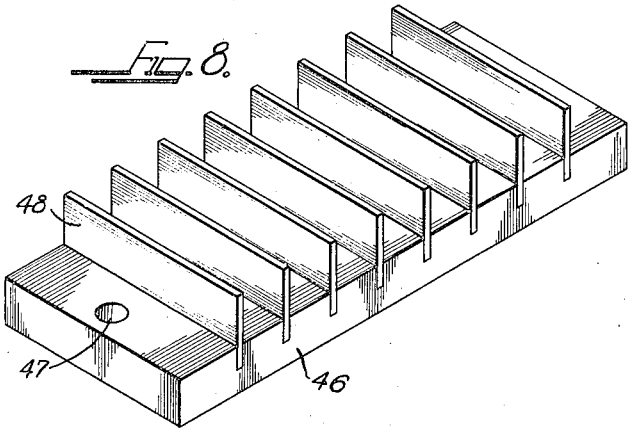
Figure 8 is a perspective view of a fifth form of the invention.

Another and still simpler form of the invention is illustrated in Figures 8 and 9. This consists merely of a base plate 46 adapted to be secured by means of screws extending through holes 47 to the top of a bench or other work surface and carrying a plurality of vertically extending stripper plates 48. The stripper plates 48 are spaced in the manner described above in connection with the other forms of the device so that a mandrel carrying a plastic binding formed about it may be laid on top of the stripping device with one ring of the binding extending around the mandrel in each of the spaces between the successive stripper plates 48. The mandrel may then be drawn endwise and pulled out of the binding which will then rest on the top of the device and may then be removed by hand. If desired, the device may be secured in a sloping position at an angle of 30° or 45° to the horizontal so that the bindings will slide off to one side as soon as they are removed from the mandrel, or suitable mechanism, such as fingers extending between the successive stripper plates 48 and swung up to one side by a foot pedal, may be devised for automatically removing the stripped bindings from the stripping device.

While I have shown but five embodiments of my invention, it will of course be understood that many more modifications and changes may be made and that other constructions different from but equivalent to those shown may be employed. Devices may be readily devised to engage the mandrel at three or four points around its circumference instead of at only one or two points. In view of these and many other modifications which will readily suggest themselves to the skilled mechanic, I claim as my invention all constructions falling within the scope of the appended claims.

I claim as my invention:

1. A device for removing plastic bindings from a mandrel about which a series of spaced rings comprising a part of the binding are formed, said device comprising a supporting member, and a plurality of stripping members carried by and projecting from said supporting member, said stripping members having stripping edges spaced from said supporting member and disposed along an imaginary straight surface, the spacing of said edges being the same as the spacing of said rings of said binding.

2. In a device for use in removing from a mandrel a plastic binding comprising a plurality of rings formed around said mandrel, a plurality of longitudinally spaced stripping members for supporting said mandrel for sliding movement, said stripping members having transversely extending shoulders for simultaneously engaging the edges of said rings.

3. In a device for removing from a mandrel a plastic binding having rings formed about said mandrel, means for engaging said mandrel on one side and for engaging each of said rings on the edge thereof, and a second means for engaging said mandrel on the other side and for engaging each of said rings on the edge thereof at a point spaced from the point engaged by said first means.

4. In a device for removing from a mandrel a plastic binding having a plurality of rings formed about said mandrel, stripping members having edges adapted to engage said mandrel between said rings, said edges lying in two intersecting imaginary planes and being perpendicular to the line of intersection of said planes.

5. In a device for removing from a mandrel a plastic binding having spaced rings formed about said mandrel, a pair of longitudinally extending supporting members, and a plurality of stripping means extending from each of said supporting members toward the other supporting member, each of said stripping means on one of said supporting members forming a pair with one of said stripping means on the other of said supporting members and the opposed edges of said stripping means forming each of said pairs converging downwardly.

6. In a device for removing from a mandrel a plastic binding having spaced rings formed about said mandrel and connected to each other by a narrow longitudinally extending portion of the binding, a pair of longitudinally extending supporting members, and a plurality of stripping means extending from each of said supporting members toward the other supporting member, each of said stripping means on one of said supporting members forming a pair with one of said stripping means on the other of said supporting members, the opposed portion of each of said pairs of stripping means being spaced far enough apart at the top to receive said mandrel therebetween and being close enough at the bottom to prevent said mandrel from passing downward between said means.

7. In a device for removing from a mandrel a plastic binding having spaced rings formed about said mandrel and connected to each other by a narrow longitudinally extending back, a pair of longitudinally extending supporting members, and a plurality of stripping means extending from each of said supporting members toward the other supporting member, each of said stripping means on one of said supporting members forming a pair with one of said stripping means on the other of said supporting members, the opposed edges in each of said pairs of stripping means being far enough at the top to receive said mandrel therebetween and close enough together at the bottom to prevent said mandrel from passing therebetween, said edges also being far enough apart at the bottom to allow said narrow longitudinally extending back of said binding to pass freely therebetween.

8. In a device for removing from a mandrel a plastic binding having a plurality of rings formed about said mandrel, means for slidably engaging said mandrel at a plurality of longitudinally spaced points and for simultaneously engaging the edge of each of said rings at a plurality of circumferentially spaced points.

9. A device for removing plastic bindings from a mandrel about which a series of spaced rings comprising a part of the binding are formed, said device comprising a supporting member, and a plurality of stripping members carried by and projecting from said supporting member, said stripping members having curved stripping edges spaced from said supporting member and disposed along an imaginary surface, said surface being straight in a direction perpendicular to said edges and said edges lying in plane perpendicular to said imaginary surface, the spacing of said edges being the same as the spacing of said rings of said binding.

10. A device for removing plastic bindings from a mandrel about which a series of spaced rings comprising a part of the binding are formed, said device comprising a supporting member, and a plurality of stripping members carried by and projecting from said supporting member, said stripping members having curved stripping edges spaced from said supporting member and disposed along an imaginary surface, said surface being straight in a direction perpendicular to said edges and the curvature of each of said edges being continuous and non-uniform, the spacing of said edges being the same as said rings of said binding.

11. A device for removing plastic bindings from a mandrel about which a series of spaced rings comprising a part of the binding are formed, said device comprising a supporting member, and a plurality of stripping members carried by and projecting from said supporting member, said stripping members having stripping edges spaced from said supporting member and disposed along an imaginary surface which is straight in a direction perpendicular to said edges, said edges each being formed with a plurality of notches of different sizes adapted to accommodate mandrels of different sizes and being spaced the same as the spacing of said rings of said binding.

12. In a device for removing from a mandrel a plastic binding having rings formed about said mandrel, means for engaging said mandrel on one side and having a plurality of shoulders, said shoulders being spaced along a line parallel thereto for engaging said rings on the edges thereof, and a second means movable with respect to said first means for engaging said mandrel on the other side and having a plurality of similarly spaced shoulders for engaging said rings on the edges thereof at points spaced from the points engaged by said first means.

13. A device for removing plastic bindings from a mandrel about which a series of spaced rings comprising a part of the binding are formed, said device comprising a supporting member having a plurality of parallel slots formed in one surface thereof, said slots having the same spacing as the rings of said bindings, and a plurality of similar stripping plates secured in said slots and having stripping edges thereon located in an imaginary surface which is straight in a direction perpendicular to said plates.

CHARLES EDWARD EMMER.